US011338450B1

(12) United States Patent
Lin et al.

(10) Patent No.: US 11,338,450 B1
(45) Date of Patent: May 24, 2022

(54) MULTI-PURPOSE END-EFFECTORS WITH ROLLERS AND PNEUMATICALLY CONTROLLED GRIPPERS FOR ROBOTIC EMBLEM INSTALLATION

(71) Applicant: GM GLOBAL TECHNOLOGY OPERATIONS LLC, Detroit, MI (US)

(72) Inventors: Yhu-Tin Lin, Rochester Hills, MI (US); Wuhua Yang, Superior Township, MI (US); Roberto Hirayama, São Paulo (BR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/099,857

(22) Filed: Nov. 17, 2020

(51) Int. Cl.
*B25J 15/08* (2006.01)
*B23P 19/04* (2006.01)

(52) U.S. Cl.
CPC ............. *B25J 15/08* (2013.01); *B23P 19/04* (2013.01)

(58) Field of Classification Search
CPC .................... B25J 15/0066; B25J 15/0061
See application file for complete search history.

(56) References Cited

U.S. PATENT DOCUMENTS

| | | | | |
|---|---|---|---|---|
| 4,620,354 A | * | 11/1986 | Hess ............... | B60J 10/45 29/451 |
| 5,243,747 A | * | 9/1993 | Mesnel ............ | B62D 65/14 29/243.58 |
| 7,637,201 B2 | | 12/2009 | Lin | |
| 7,971,916 B2 | | 7/2011 | Lin et al. | |
| 8,025,277 B2 | | 9/2011 | Lin et al. | |
| 8,033,002 B2 | * | 10/2011 | Lin ................. | B25J 15/0052 901/41 |
| 8,087,845 B2 | | 1/2012 | Lin et al. | |
| 8,371,631 B2 | | 2/2013 | Lin | |
| 8,496,425 B2 | | 7/2013 | Lin et al. | |
| 8,684,418 B2 | | 4/2014 | Lin et al. | |
| 8,702,340 B2 | | 4/2014 | Lin et al. | |
| 8,857,877 B2 | | 10/2014 | Lin et al. | |
| 9,120,231 B2 | | 9/2015 | Lin et al. | |
| 9,643,313 B2 | * | 5/2017 | Hafenrichter ...... | F01D 5/005 |
| 9,656,394 B2 | | 5/2017 | Lin et al. | |

(Continued)

FOREIGN PATENT DOCUMENTS

| | | |
|---|---|---|
| DE | 19746144 B4 | 5/2007 |
| DE | 102018200439 A1 | 7/2019 |

(Continued)

OTHER PUBLICATIONS

First Office Action for German Application No. 102020114062.5, dated Jan. 20, 2022; 7 pages.

*Primary Examiner* — Jason L Vaughan (57) ABSTRACT

An end-effector for installation of an emblem assembly is provided. The end-effector includes a support frame, a first splitter, and a second splitter. The first splitter and the second splitter are connected to the support frame. The pneumatically actuated grippers include: a first gripper connected to the first splitter and configured to grab at least a portion of the emblem assembly; and a second gripper connected to the second splitter and configured to peel off one or more layers of the emblem assembly. The roller is connected to the support frame and configured to wet out an adhesive layer of the emblem assembly.

20 Claims, 10 Drawing Sheets

(56) References Cited

U.S. PATENT DOCUMENTS

| | | |
|---|---|---|
| 9,682,484 B2 | 6/2017 | Lin et al. |
| 9,808,933 B2 | 11/2017 | Lin et al. |
| 10,011,022 B1 | 7/2018 | Lin et al. |
| 10,011,023 B1 | 7/2018 | Lin et al. |
| 2019/0217481 A1 | 7/2019 | Lessing et al. |

FOREIGN PATENT DOCUMENTS

| | | |
|---|---|---|
| DE | 102017129496 B4 | 6/2020 |
| DE | 102020104399 B3 | 5/2021 |
| JP | 2007222971 A | 9/2007 |

* cited by examiner

MULTI-PURPOSE END-EFFECTORS WITH ROLLERS AND PNEUMATICALLY CONTROLLED GRIPPERS FOR ROBOTIC EMBLEM INSTALLATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to emblem installation.

Emblems are attached to various products. For example, an emblem indicating a model of a vehicle is often attached to a body panel of the vehicle. The emblems may be manually attached without use of a tool or may be manually attached using a tool. As an example, an emblem may be attached using a template, which includes locators for positioning the emblem on the body panel. A hand roller is then used to wet out emblem tape that is on a backside of the emblem. The hand roller includes a roller that is rolled across the emblem while pressure is applied by the operator to squeeze the emblem tape and adhesive. This is done to uniformly distribute the adhesive, remove any air pockets and assure that the emblem is properly attached to the body panel.

A pneumatic tool may be used to apply an emblem instead of the template and the roller. The operator places the emblem on the pneumatic tool, manually aligns the pneumatic tool with the panel on which the emblem is to be adhered, and then the pneumatic tool applies pressure on the emblem to wet out the corresponding emblem tape. This technique eliminates the need for the operator to manually roll a roller over the emblem to wet out the emblem tape.

SUMMARY

An end-effector for installation of an emblem assembly is provided. The end-effector includes a support frame, a first splitter, and a second splitter. The first splitter and the second splitter are connected to the support frame. The pneumatically actuated grippers include: a first gripper connected to the first splitter and configured to grab at least a portion of the emblem assembly; and a second gripper connected to the second splitter and configured to peel off one or more layers of the emblem assembly. The roller is connected to the support frame and configured to wet out an adhesive layer of the emblem assembly.

In other features, the first splitter includes a center member and finger holding members attached to the center member.

In other features, the pneumatically actuated grippers further include a third gripper connected to the first splitter. The first gripper and the third gripper are configured for at least one of concurrent actuation or independent actuation.

In other features, the first splitter is connected to the support frame via an adaptor. The adaptor is configured to connect the support frame and the first splitter to a robot.

In other features, the first gripper includes finger support members arranged on fingers of the first gripper to prevent at least one of buckling of a layer of the emblem assembly or movement of the emblem assembly relative to the first gripper due to contact force applied on the emblem assembly as a result of contacting an object during placement of the emblem assembly on the object.

In other features, the finger support members are attached to respective inner sides of the fingers.

In other features, the second gripper includes a tie-wrap wrapped around fingers of the second gripper and limiting movement of the fingers of the second gripper.

In other features, the roller is connected adjacent to the first gripper and having an axis of rotation perpendicular to a rolling direction to be rolled over the emblem assembly.

In other features, the end-effector further includes one or more additional grippers connected to the first splitter and configured to grab at least a portion of the emblem assembly.

In other features, the fingers of the first gripper are arranged in a circular pattern.

In other features, an emblem installation system is provided and includes the end-effector, a pump and a controller. The pump is configured to supply air to or draw air from the end-effector to actuate the first gripper and the second gripper. The controller is configured to control operation of the pump based on mode of operation.

In other features, the emblem installation system further includes a robot connected to the end-effector. The controller is configured to control operation of the robot to move the end-effector for placement of the emblem assembly on an object, to wet out the adhesive layer by moving the end-effector via the robot, and to peel off the one or more layers of the emblem assembly.

In other features, a method of installing an emblem assembly is provided. The method includes: moving an end-effector to at least one of pick up and grab the emblem assembly via a first gripper of the end-effector, where the emblem assembly includes a first liner, an adhesive layer, an emblem, and a second liner; peeling off the first liner from the emblem assembly; moving the end-effector and placing the emblem assembly on an object; releasing the first gripper from the emblem assembly; moving the end-effector to position a roller of the end-effector against the emblem assembly; wetting out the adhesive layer including rolling the roller over the emblem assembly while applying pressure on the emblem assembly; moving a second gripper to grab a portion of the second liner; and moving the end-effector to peel off the second liner.

In other features, the method further includes grabbing a portion of the first liner with the second gripper. The first liner is peeled off the emblem assembly while maintaining grip on the first liner. In other features, the method further includes holding portions of fingers of the second gripper together via a tie-wrap.

In other features, the at least one picking up or grabbing the emblem assembly includes pneumatically actuating fingers of the first gripper including providing a positive pressure in the fingers of the first gripper to close the first gripper.

In other features, releasing the first gripper and wetting out the adhesive layer includes pneumatically actuating fingers of the first gripper including providing a negative pressure in the fingers of the first gripper to open and curl up the fingers.

In other features, peeling away the second liner includes pneumatically actuating fingers of the second gripper including providing a positive pressure in the second gripper to close the second gripper.

In other features, the method further includes providing gripper support elements on fingers of the first gripper to prevent at least one of: buckling of a layer of the emblem assembly; or slipping-off of the emblem assembly from the first gripper due to contact force applied on the emblem assembly by placing the emblem assembly on the object.

In other features, the method further includes peeling away a foam carrier from the emblem assembly using the second gripper.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
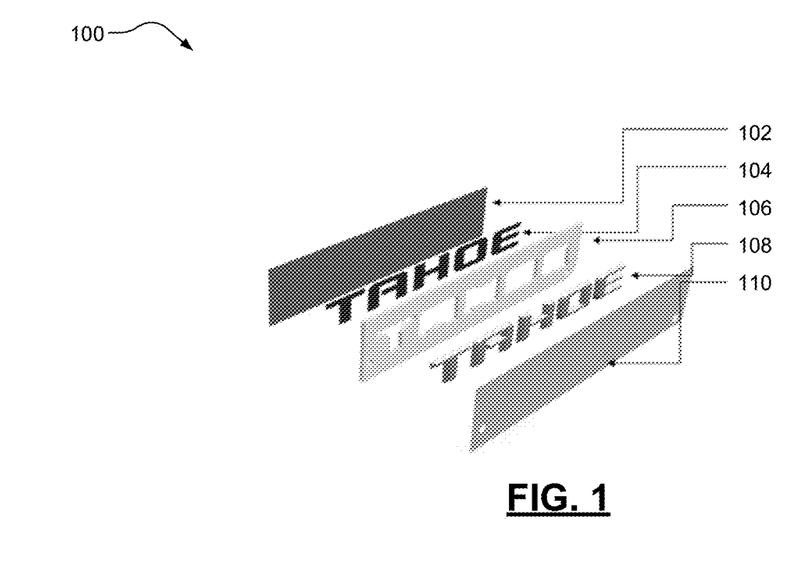
FIG. 1 is a perspective view of an example of an emblem assembly.

FIG. 1 shows an example emblem assembly 100 that includes an adhesive liner (or tape liner) 102, an adhesive layer (or tape layer) 104, a foam carrier 106, a name plate 108 and a face liner 110. During application of the name plate onto a panel, an operator picks the emblem assembly 100 out of a bin or magazine, including multiple emblem assemblies, and manually peels the adhesive liner 102 off a back side of the adhesive layer 104. The adhesive layer 104 may be implemented as double-sided tape including multiple layers or may simply include adhesive that is applied on a back side of the name plate 108. The adhesive layer 104 is used to attach the name plate 108 to the panel. Subsequent to peeling off the adhesive liner 102, the name plate 108 is attached to the panel.

The foam carrier 106 is included to maintain positional relationships between discrete characters of the name plate 108. The foam carrier 106 may include tacky inner edges to provide temporary attachment of the foam carrier 106 to the name plate 108 and/or the face liner 110. The face liner 110 covers the name plate 108 to help keep all characters of the name plate 108 in the foam carrier 106 and protect the name plate 108 including preventing the name plate 108 from, for example, getting scratched prior to and/or while being attached to the panel. The foam carrier 106 remains around the characters of the name plate 108 and the face liner 110 remains on the name plate 108 until after attachment of the name plate 108 to the panel. After the adhesive layer 104 of the name plate 108 is wet out manually using a roller or pneumatically using a tool that applies pressure on the name plate 108, the foam carrier 106 and the face liner 110 are manually peeled off the panel and the name plate 108.

Due to the manual application of emblems, quality defects can arise. This can be due to misaligned emblems, missing emblems, loose emblems, or attachment of wrong emblems. In addition, damage to surfaces of emblems and/or panels (e.g., finish-painted body panels) on which the emblems are attached can occur. The manual attachment of emblems is manufacturing efficiency limited and has associated labor costs, tooling costs, and defect correction costs.

The examples set forth herein include robotic emblem installation systems including end-effectors with flexible actuated grippers (sometimes referred to as fingers) and a wet-out roller. The end-effectors are configured to perform the steps of an emblem installation process from initial pickup of emblem assemblies to peeling off foam carriers and face liners. This includes peeling off adhesive liners, attaching emblems to panels (or other objects), and wetting out the adhesive layers. The end-effectors have a unique 3-in-1 design that allows a robot to complete five or more operations of emblem installation via one tool (i.e. end-effector). The examples improve productivity, reduce quality defects, lower tooling and labor costs, and prevent installation damage to the surface of emblems and panels, thereby maintaining surface integrity of the emblems and panels.

The example end-effectors disclosed herein include flexible soft grippers for handling emblems of various sizes and shapes. In some embodiments, the grippers include gripper supports to aid in grasping, holding and installing hard-to-hold emblems, such as emblems with bevel edges. Some of the grippers include respective tie-wraps, which are included to limit the range of motion of the grippers and cause the grippers to move in a particular manner to allow for peeling off foam carriers and/or face liners of emblem assemblies.

Although the following examples are primarily directed to applying emblems on body panels of a vehicle, the examples are applicable to applying emblems to other various objects, such as body panels, components, housings, and/or products.

Figure 2:
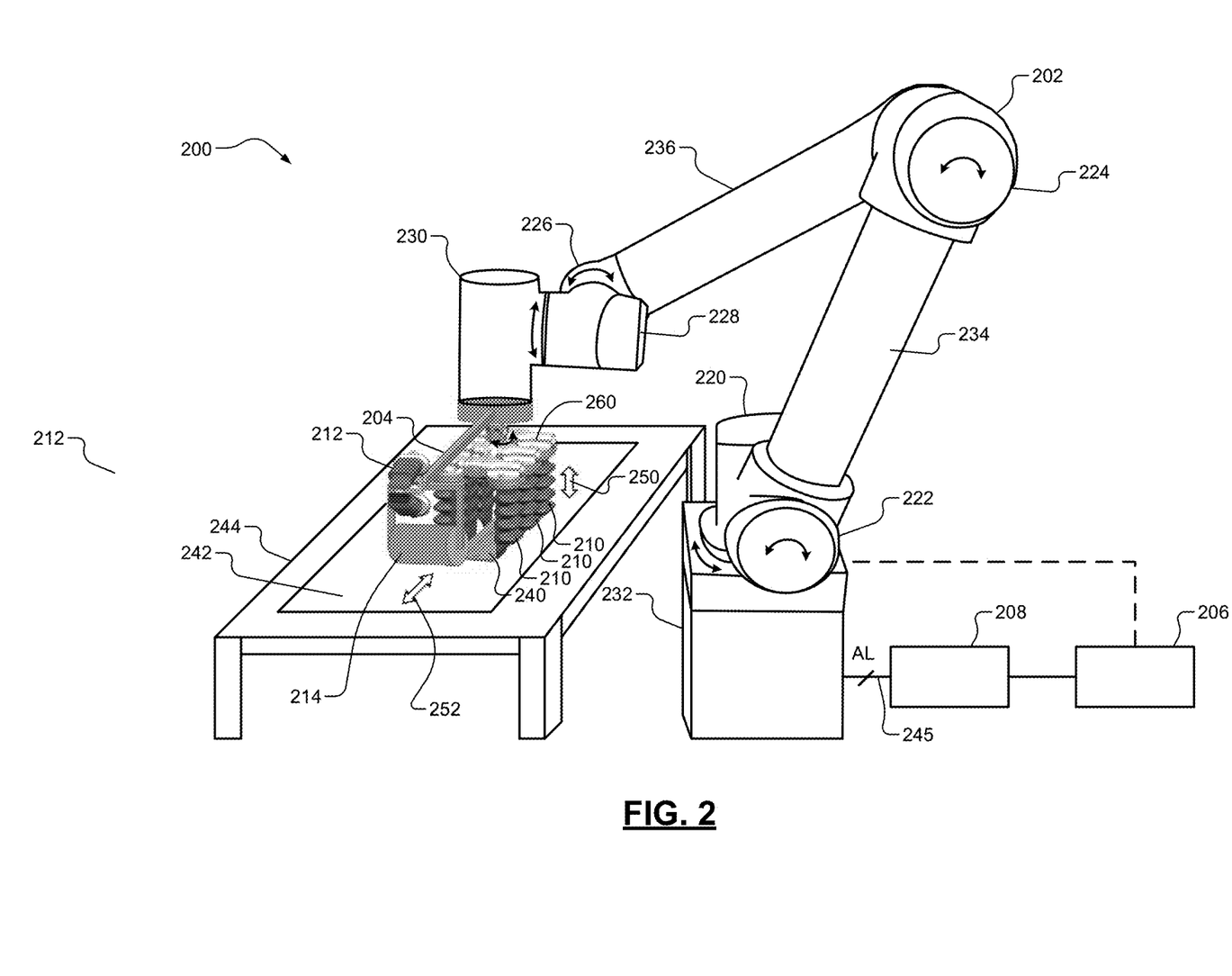
FIG. 2 is a perspective view of a robotic emblem installation system including an end-effector with multiple sets of grippers and a roller in accordance with the present disclosure.

FIG. 2 shows a robotic emblem installation system 200 that includes a robot 202, an end-effector 204, a control module 206 and a pump 208. The control module 206 controls movement of the robot 202 and the end-effector 204 including actuation of emblem grabbing grippers 210 and a peeling gripper 212 of the end-effector 204. The end-effector 204 is a 3-in-1 end-effector meaning that it has multiple purposes including peeling, grabbing and rolling (or wetting out adhesive layers). The end-effector 204 includes a roller 214 for wetting out adhesive layers of emblems.

The robot 202 may include multiple electric motors 220, 222, 224, 226, 228, 230 that provide six degrees of freedom including movement in X, Y, Z directions as well as rotational movement of the end-effector 204. The robot 202 may be attached to a stand 232 as shown or may be mounted on a moving object, such as a second robot, for moving the robot 202 from one location to another location. Arms 234, 236 extend between the motors 222, 224, and 226.

The control module 206 may control the robot 202 and the end-effector 204 to attach an emblem (a partial emblem assembly 240 is shown including a name plate) on a panel 242 that is disposed on a table 244. The partial emblem assembly 240 does not include a tape liner that has already been removed, hence use of the term "partial". Although shown applying an emblem on a panel in a vertical direction, the robot 202 and the end-effector 204 may be used to apply an emblem in any direction. The end-effector 204 is shown in an emblem placement state in FIG. 2, where the peeling gripper 212 and the roller 214 are in an idle state.

The grippers 210 and 212 are controlled pneumatically via air lines 245 and/or channels in the robot that extend from the end-effector 204 to the pump 208. The number of air lines AL between the pump 208 and the end-effector 204, depends on the number of grippers 210, 212 and corresponding fingers 297, 299 (FIGS. 3 and 4) and the arrangement of the grippers and fingers. An air line (similar to air lines 245) and/or channel may be included for each gripper or for one or more grippers. An air line (similar to air lines 245) may be provided for each finger of each gripper or shared by the fingers of each gripper. In the example shown, three emblem grabbing (also referred to as pick-and-place) grippers 210 and a peeling gripper 212 are included, where each gripper has two flexible opposing fingers 297 and 299 respectively. An air line (similar to air lines 245) for each gripper provides independent actuation control of each gripper. An air line (similar to air lines 245) for each finger provides independent actuation control of each finger. In one embodiment, an air line (similar to air lines 245) and/or air channel is provided for each pair of grippers. The air lines (similar to air lines 245) and/or air channels may extend from the pump 208 along or through the robot 202 and to a splitter (or air distributor) 260 of the end-effector 204.

Figure 17:
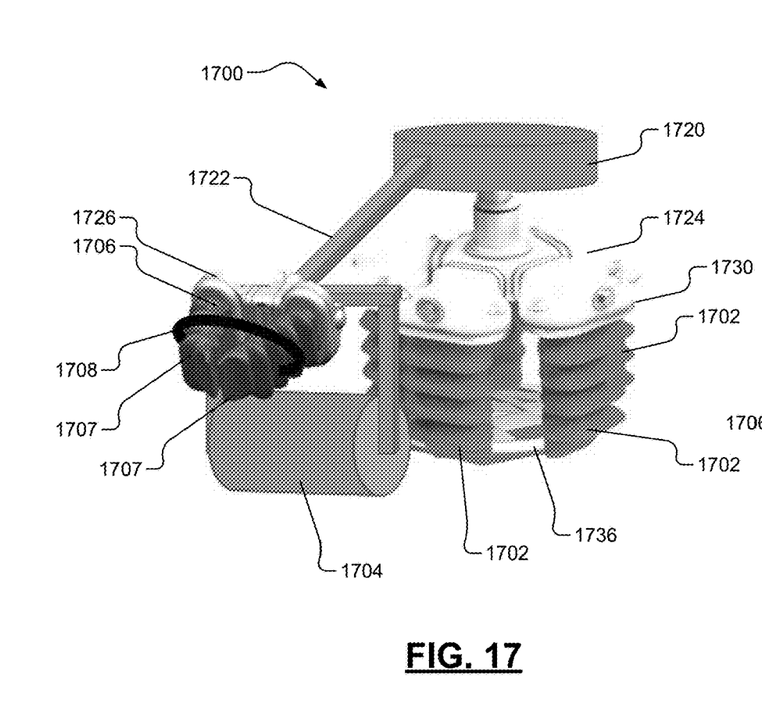
FIG. 17 is a perspective view of an example of another end-effector having one or more grippers with fingers in a circular configuration and in a closed state in accordance with the present disclosure.
Figure 18:
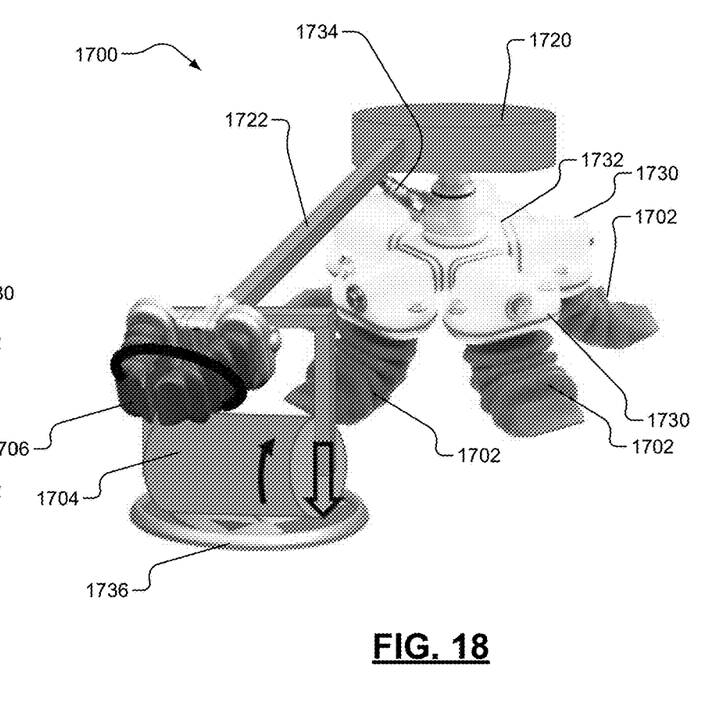
FIG. 18 is a perspective view of the end-effector of FIG. 17 with the fingers in an open state in accordance with the present disclosure.

Although the end-effector 204 is shown having three emblem grabbing grippers 210 and one peeling gripper 212, any number of each may be incorporated into the end-effector 204. As an example, the end-effector 204 may have 1, 2, 3, or 4 emblem grabbing grippers (similar to the grippers 210). An even or odd number of grippers may be included. An even or odd number of gripper fingers may be included. For example, when configured to grab circular emblems an odd number of fingers may be included, as shown in FIGS. 17-18. An odd number of fingers may also be included when opposing fingers are offset from each other, such that one or more fingers are at least partially across from two or more other fingers. In the example shown, two rows of opposing fingers of three grippers 210 are shown, where each gripper 210 includes two fingers 297 and each row of fingers 297 is in contact with a single side edge of the partial emblem assembly 240.

Figure 4:
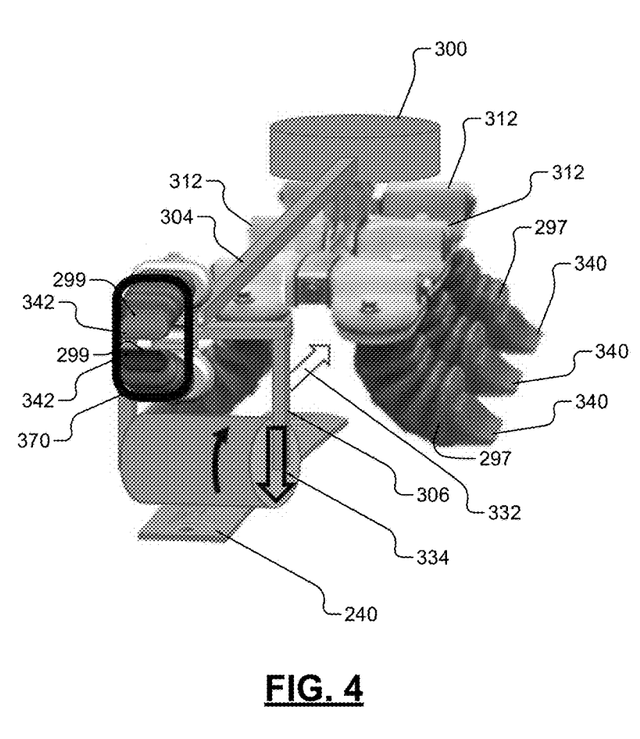
FIG. 4 is a perspective view of the end-effector of FIG. 2 illustrating a wet out mode with the emblem grabbing grippers in an idle state, the roller in an active and the peeling gripper in the idle state in accordance with the present disclosure.

Arrow 250 is shown to indicate movement of the end-effector 204 in the vertical direction by the robot 202. Arrow 252 is shown to indicate movement of the end-effector 204 in a lateral direction when the roller 214 is used on the partial emblem assembly 240. When used, the roller 214 is moved downward and the emblem grabbing grippers 210 are transitioned to an open state as shown in FIG. 4. Operation of the end-effector 204 and the grippers 210, 212 and movement of the roller 214 are further described below.

Figure 3:
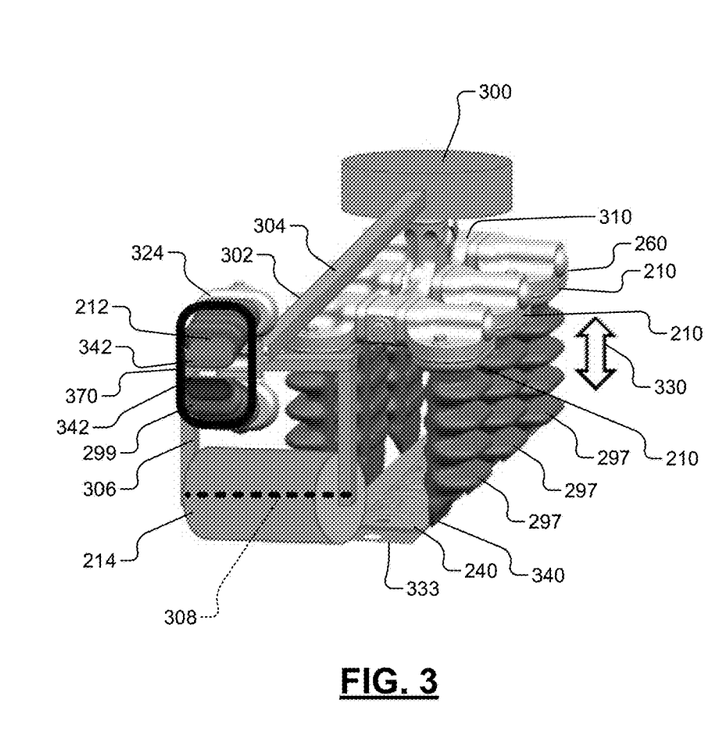
FIG. 3 is a perspective view of the end-effector of FIG. 2 illustrating a pick-up mode with emblem grabbing (or pick-and-place) grippers in an emblem holding state, the roller is an idle state and a peeling gripper in an idle state in accordance with the present disclosure.
Figure 5:
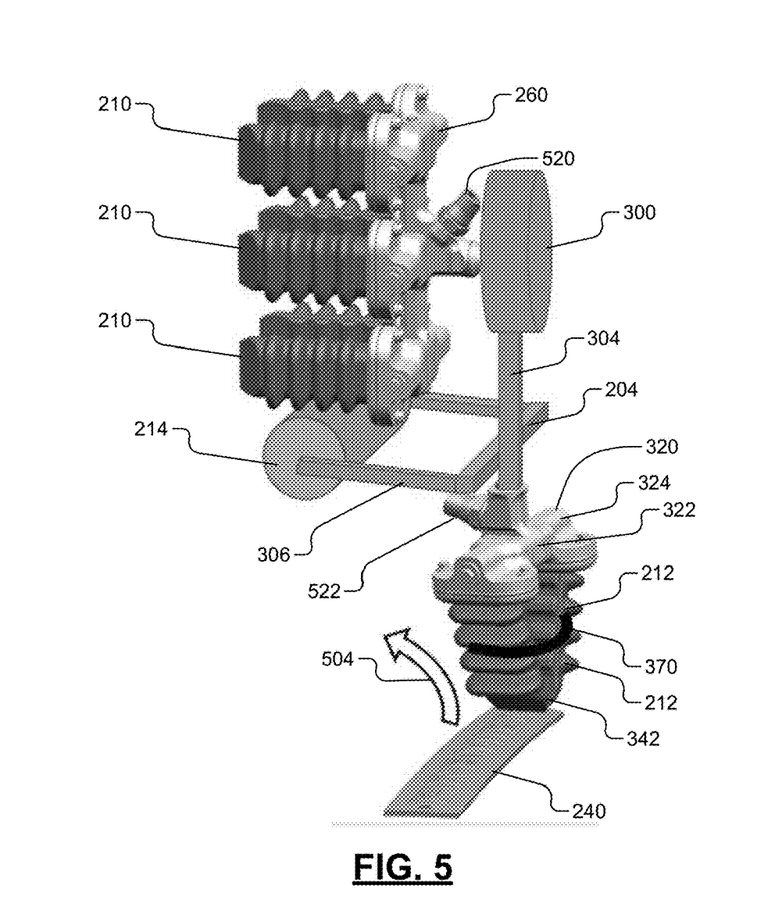
FIG. 5 is a perspective view of the end-effector of FIG. 2 illustrating start of a peeling mode in accordance with the present disclosure.
Figure 6:
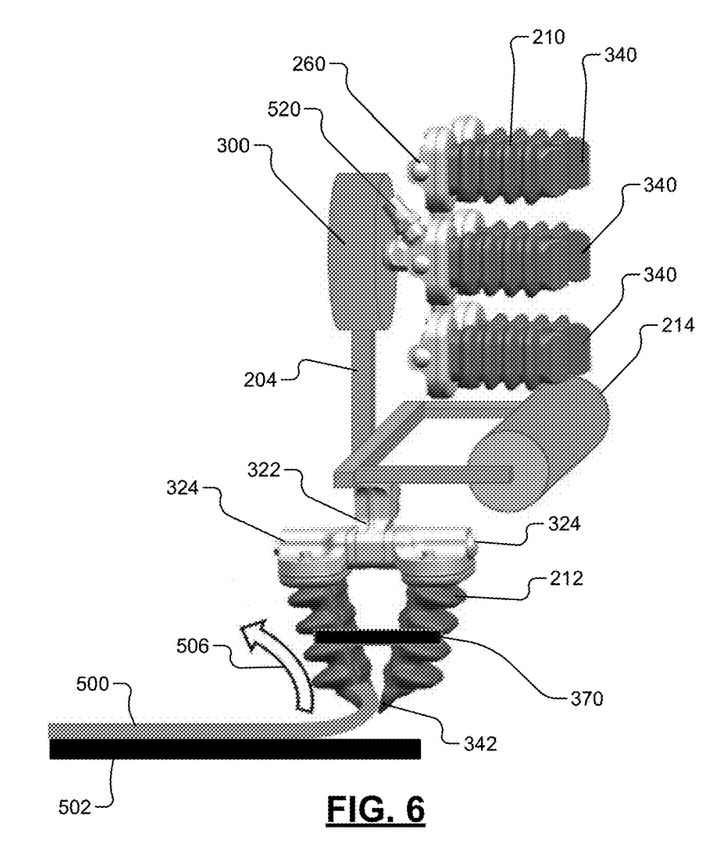
FIG. 6 is a perspective view of the end-effector of FIG. 2 illustrating peeling a layer from an emblem assembly in accordance with the present disclosure.

FIGS. 3-6 show the end-effector 204 in different states and modes. FIG. 3 shows the emblem grabbing grippers 210 in an emblem holding state, the roller 214 is an idle state and the peeling gripper 212 is an idle state. FIG. 4 shows the end-effector 204 in a wet out mode. FIG. 5 shows the end-effector 204 at a start of a peeling mode of operation. FIG. 6 shows the end-effector 204 peeling off a layer of the partial emblem assembly 240.

Fingers 297, 299 of the grippers 210, 212 may be formed of rubber, silicone elastomers, polyurethane and/or other suitable material. The material is soft enough not to scratch an object on which an emblem is being installed, but yet firm enough to grab and hold the corresponding emblem assembly 240 and/or portions thereof. In an embodiment, the fingers 297, 299 are hollow and include ribs as shown for flexibility. In the example shown, each finger has four ribs, however the fingers 297, 299 may have any number of ribs. The fingers 297, 299 are actuated and controlled pneumatically for picking up, placing, and peeling emblem assembly layers and materials. This is accomplished without harming delicate surface finishes of the corresponding emblems and the objects (e.g., vehicle body panels) on which the emblems are installed.

The control module 206 of FIG. 2 provides via the pump 208 positive pressure of compressed air to the grippers 210, 212 to collapse (or curl inward) the fingers 297, 299 to grab emblem materials as shown in FIGS. 3, 5 and 6. This may be referred to as a closed state. The control module 206 provides negative pressure (or a vacuum) inside the fingers 297, 299 to open and/or spread the fingers 297, 299 as shown in FIG. 4. This may be referred to as an open state. The fingers 297, 299 may be in a curled-up state when in the open state, as shown in FIG. 4 for fingers 297.

In FIGS. 3-6, the end-effector 204 is shown including the grippers 210, 212, the roller 214, and the splitter 260. The end-effector 204 further includes a robot adaptor 300 and a support frame 302. The robot adaptor 300 is used to connect the end-effector 204 to an end of the robot 202 of FIG. 2 and/or other robot. The support frame 302 includes multiple members (e.g., a main member 304 and a fork 306) that extend from the robot adaptor 300 to the gripper 212 and the roller 214. The roller 214 is free to rotate on a shaft 308 connected to the frame 302. The roller 214 may be formed out of rubber or other suitable material. One or more air lines (similar to the air lines 245) and/or channels may extend from the adaptor 300 to a second splitter 320, which is connected to the gripper 212.

The splitter 260 includes a center member 310 (called out in FIG. 3) and finger holding members 312 (called out in FIG. 4). A similar splitter 320 including a similar center member 322 (called out in FIGS. 5-6) and finger holding members 324 (called out in FIGS. 3, 5-6) are provided for the gripper 212. The grippers 210 are connected to receive air from and/or have air drawn by the finger holding members 312. The finger holding members 312 may be fixed relative to the center member 310.

In FIG. 3, arrow 330 is provided to indicate that the end-effector 204 may be moved in a vertical direction. In FIG. 4 arrow 332 is provided to indicate that the end-effector 204 may be moved in a lateral direction. In FIG. 3, the full emblem assembly is shown with the tape liner 333 prior to removal from the partial emblem assembly 240. As an example, the full emblem assembly may include the tape liner 333, one or more adhesive or tape layers, a foam carrier, a name plate and/or emblem layer, and a face liner. In FIG. 4, arrow 334 is provided to indicate that the fork 306 may be moved in a vertical direction to apply pressure on the partial emblem assembly 240 while the roller 214 is moved across the partial emblem assembly 240 during a wet out operation.

The fingers 297, 299 include wedge-shaped tips 340, 342 with flat inner sides and tapered outer sides. The wedge-shaped tips 340, 342 allow for precise grabbing of emblem materials. The fingers 299 are also held together with a tie-wrap 370, which limits movement of the fingers 299. The tie-wrap 370 is further described below.

Figure 14:
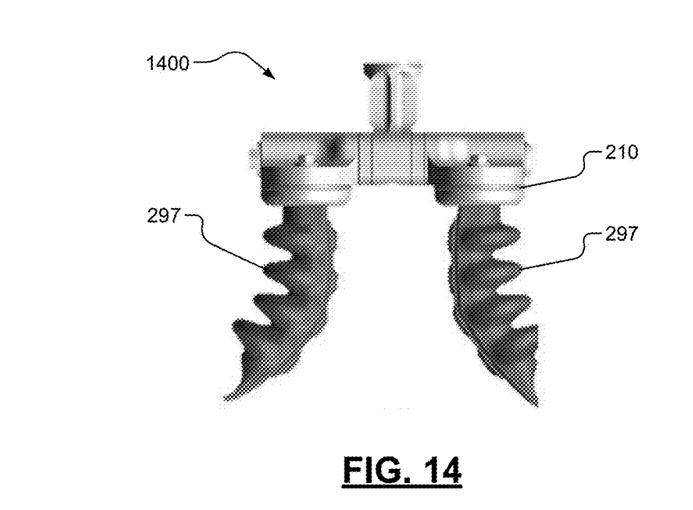
FIG. 14 is a side end view of a portion of the end-effector of FIG. 2 illustrating a free-open state of a gripper in accordance with the present disclosure.
Figure 15:
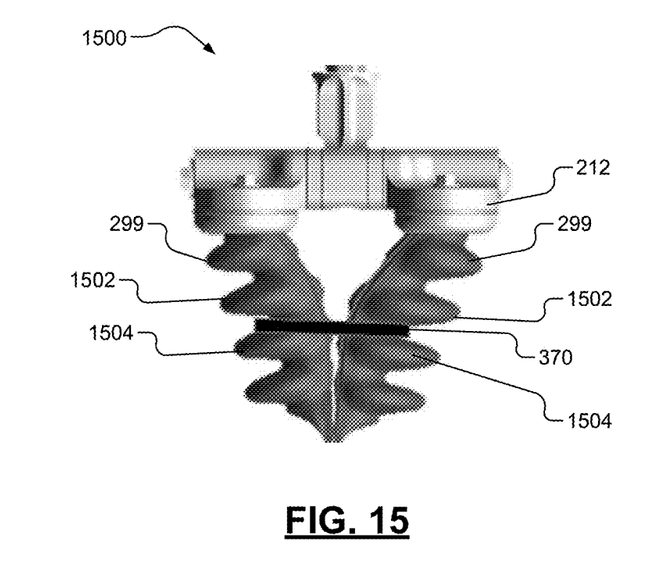
FIG. 15 is a side end view of a portion of the end-effector of FIG. 2 illustrating a tied-closed state of a gripper in accordance with the present disclosure.
Figure 16:
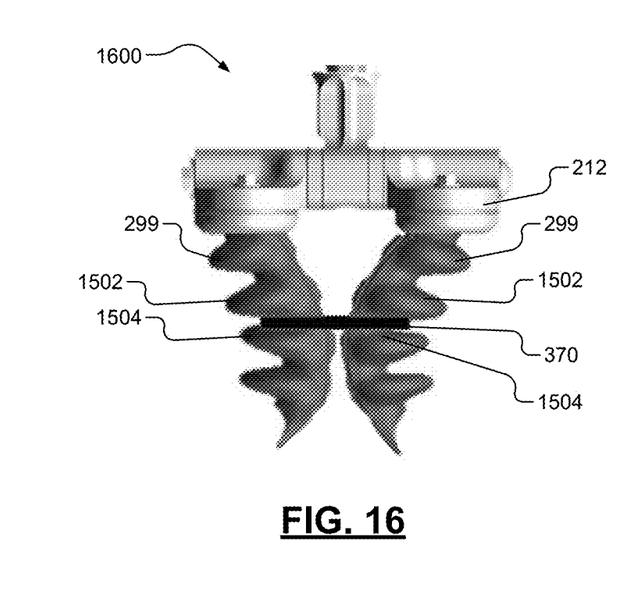
FIG. 16 is a side end view of a portion of the end-effector of FIG. 2 illustrating a tied-open state of a gripper in accordance with the present disclosure.

In FIGS. 5 and 6, the gripper 212 is shown peeling a face liner 500 off a layer 502, which may include a foam carrier and a name plate. In one embodiment, the foam carrier is peeled away along with the face liner 500. The foam carrier may be adhered to the face liner 500 and be removed when the face liner 500 is removed. In another embodiment, the foam carrier is removed in a separate operation from removal of the face liner 500. Arrow 504, 506 are shown to indicate a peeling away motion of the end-effector 204. The tie-wrap 370 allows end portions of the fingers 299 to be in a parallel arrangement as shown in FIG. 15 when a positive pressure is applied, as opposed to curling inward and having a convex shape, as does the fingers shown in FIG. 13. The tie-wrap 370 allows the fingers 299 to be held together and transition to having a concave shape as shown in FIG. 16 when a negative pressure is applied, as opposed to being separated and having a concave shape as does the fingers of FIG. 14. Inclusion of the tie-wrap 370 allows the wedge tips 342 to better grab and hold an end of one or more uppermost layers (e.g., the face liner 500) of the partial emblem assembly 240. The robot 202 of FIG. 2 is then able to move the end-effector 204 to peel off the one or more uppermost layers.

Air line connectors 520, 522 are shown. Each of the air line connectors 520, 522 may be connected to one or more air lines. Although a single air line connector is shown for each of the splitters 260, 320, additional air line connectors may be included.

Figure 7:
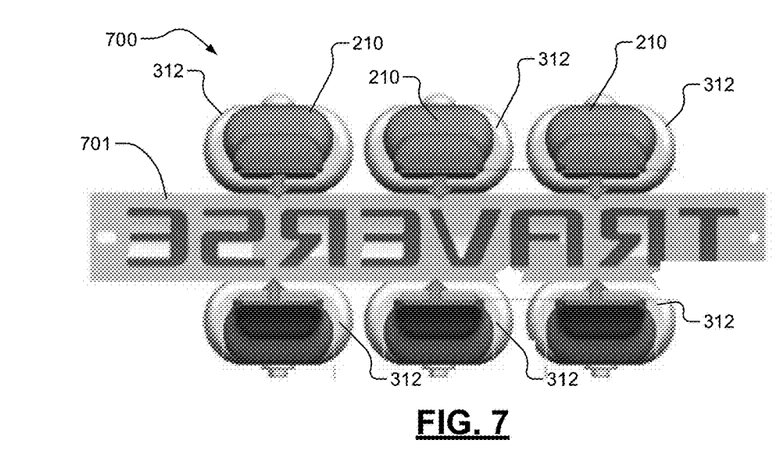
FIG. 7 is a bottom view of a portion of the end-effector of FIG. 2 illustrating use of one of the emblem grabbing grippers on an emblem assembly in accordance with the present disclosure.

FIG. 7 shows a bottom view of a portion 700 of the end-effector 204 of FIGS. 2-6 illustrating use of the grippers 210 on a long emblem assembly 701. The grippers 210 are shown in an open state prior to grabbing the emblem assembly 701. The arrows show all of the grippers 210 grabbing on the edges of the foam carrier of the emblem assembly 701 in a closed state with the pneumatic actuation from the air line 245. A bottom view of the emblem assembly 701 is shown.

Figure 8:
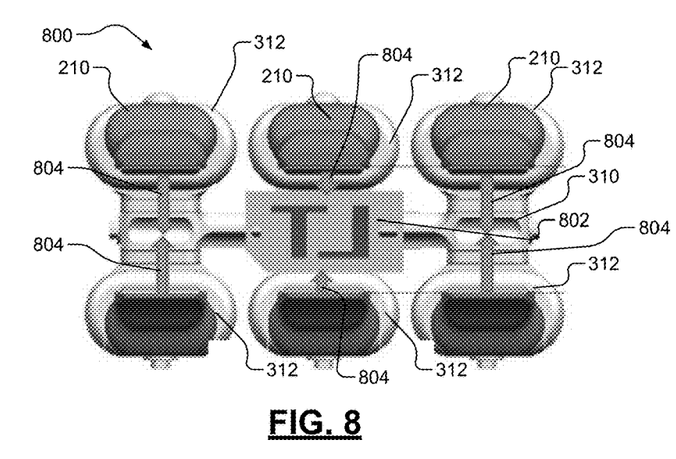
FIG. 8 is a bottom view of a portion of the end-effector of FIG. 2 illustrating another selective use of one of the emblem grabbing grippers in accordance with the present disclosure.

FIG. 8 shows a bottom view of a portion 800 of the end-effector 204 of FIGS. 2-6 illustrating selective use of a center one of the grippers 210 on a short emblem assembly 802. A bottom view of the emblem assembly 802 is shown. The gripper fingers 297 are attached to the finger holding members 312. The finger holding members 312 are attached to the center member 310. The grippers 210 may be closed concurrently using the same pneumatic actuation, although only the center one of the grippers 210 is being utilized in the shown example to grab the emblem assembly 802. The fingers of the other two grippers 210 close to their opposing fingers. This is indicated by arrows 804. In another embodiment, the center one of the grippers 210 may be actuated to grab the emblem assembly 802 while the other ones of the gripper 210 may remain in an open state if the grippers 210 are actuated independently by multiple air lines 245.

Figure 9:
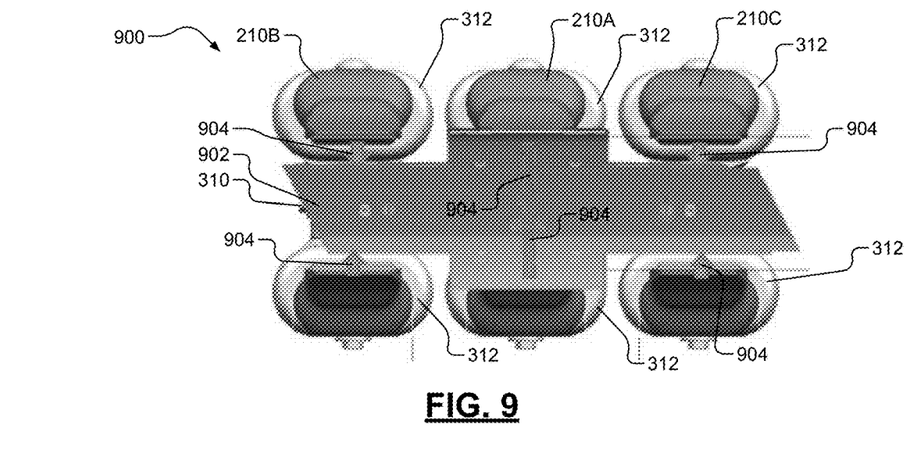
FIG. 9 is a bottom view of a portion of the end-effector of FIG. 2 illustrating selective use of some or all of the emblem grabbing grippers in accordance with the present disclosure.
Figure 13:
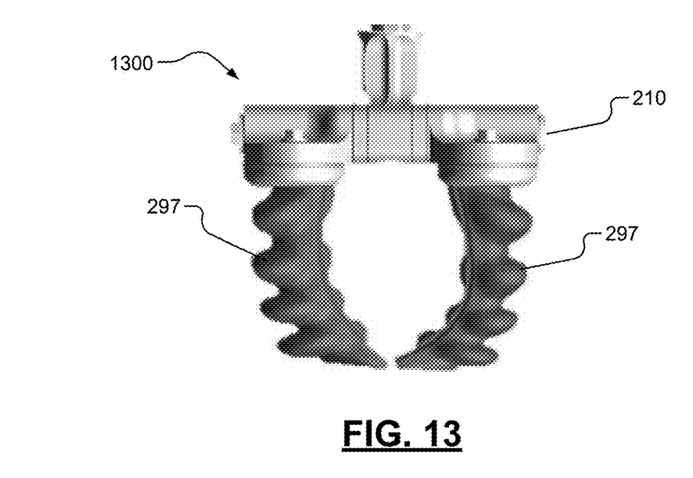
FIG. 13 is a side end view of a portion of the end-effector of FIG. 2 illustrating a free-closed state of a gripper in accordance with the present disclosure.

FIG. 9 shows a bottom view of a portion 900 of the end-effector 204 of FIGS. 2-6 illustrating selective use of some or all of the grippers 210. A bottom view of an emblem assembly 902 is shown and has varying width. In the example shown, fingers of the center gripper 210A is not able to separate far enough to grab a center portion of the emblem assembly 902. As a result, when the grippers 210A, B, C are actuated the outer grippers 210B and 210C grab the emblem assembly 902 and the center gripper closes over the emblem assembly 902 and does not grab the emblem assembly 902. This is indicated by arrows 904. The fingers of the center gripper 210A may close such that tips of the fingers are close to each other (as shown in FIG. 13) and/or in contact with each other. In another embodiment, the grippers 210 are able to be independently controlled/actuated for grabbing different shaped and sized emblem assemblies having for example different widths. The grippers 210 may have different closed positions to be able to grab different parts of an emblem assembly having different widths.

Figure 10:
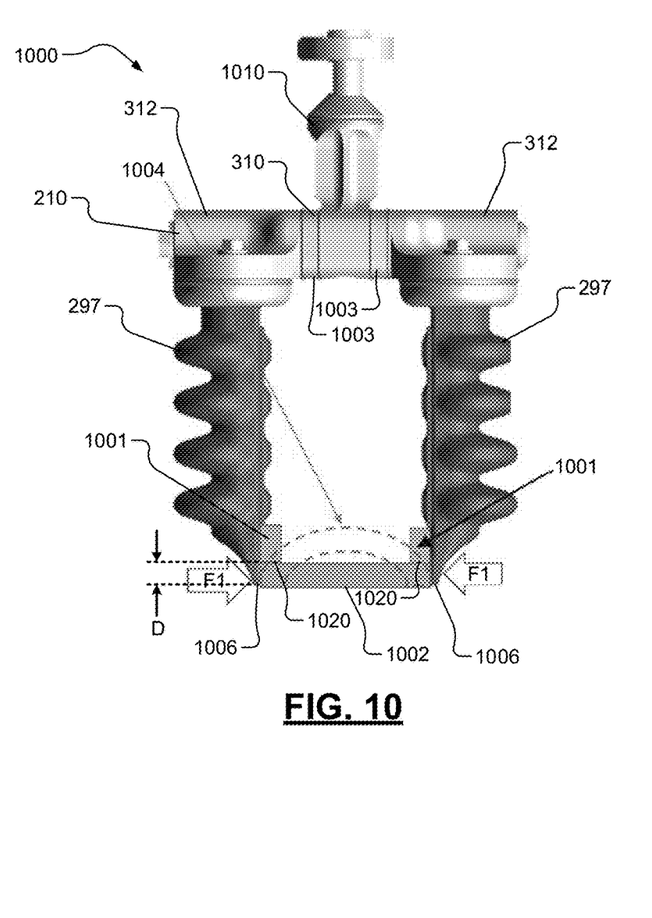
FIG. 10 is a side end view of a portion of the end-effector of FIG. 2 illustrating a gripper including finger support members grabbing a rectangular emblem in accordance with the present disclosure.
Figure 11:
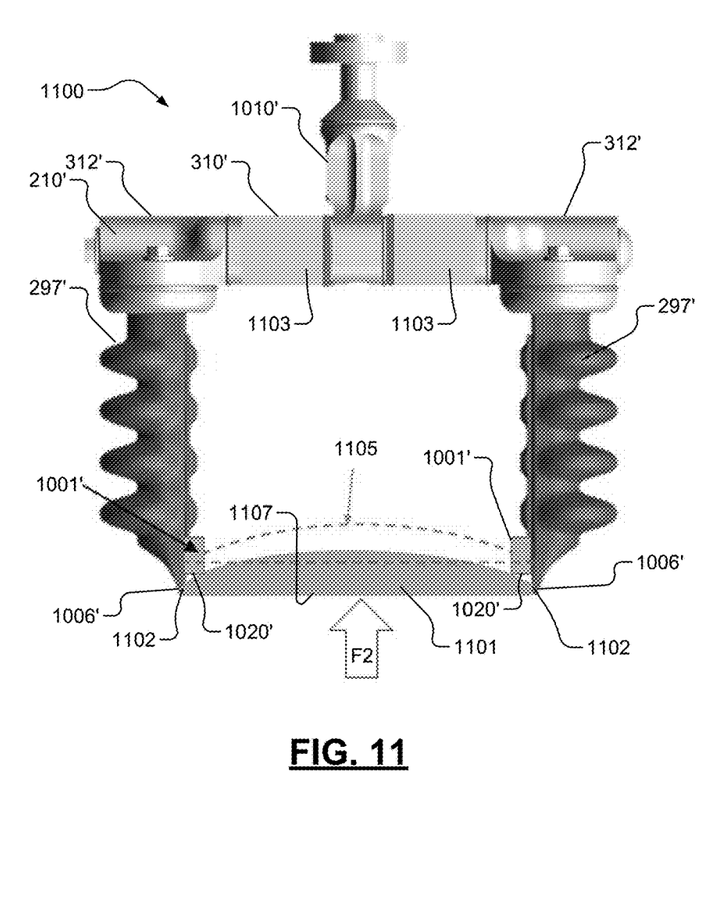
FIG. 11 is a side end view of a portion of another end-effector illustrating a gripper including the finger support members grabbing a circular emblem with beveled edges in accordance with the present disclosure.

FIG. 10 shows a portion 1000 of the end-effector 204 of FIGS. 2-6 including one or more grippers (one gripper 210 is shown in FIG. 10) with finger support members 1001 and grabbing a rectangular emblem assembly 1002. FIG. 11 shows a portion 1100 of another end-effector with one or more grippers (one gripper 210' is shown in FIG. 11) with finger support members 1001' and grabbing an emblem assembly 1101 with beveled edges 1102. The end effector is similar to the end effector 204 of FIGS. 2-6, except the finger holding members 312' are further apart due to a wider center member 310', than the center member 310 of FIGS. 2-6. The center member 310' includes spacers 1103 that are wider than spacers 1003 of the center member 310 of FIG. 10. The wider spacers 1103 further separate fingers 297' of the gripper 210' to enable grabbing wider emblem assemblies. The center members 310, 310' may be connected to the adaptor 300 (or the like) of FIGS. 2-6 via couplers 1010, 1010'.

If the finger support members 1001, 1001' are not provided, then at least one or more layers of the corresponding emblem assembly, such as the foam carrier and face liner layers of an emblem assembly 1002 may buckle, as represented by the arched dashed structure 1004. Arrows F1 represent the force applied on side edges of the emblem assembly 1002.

FIG. 11 shows that a bevel edged emblem assembly (e.g., the emblem assembly 1101) may shift up along a gripper 210' due to a contact force on the back side 1107 of the emblem assembly with an object. This may occur if the finger support members 1001' are not included and when placing the emblem assembly on the object. This is represented by dashed emblem structure 1105 and the force arrow F2.

In FIG. 10 near the tip of each of the fingers 297, is one of the finger support members 1001. Similarly, in FIG. 11 near the tip of each of fingers 297', is one of the finger support members 1001'. The finger support members 1001, 1001' may be attached to the corresponding gripper at set locations along inner sides of the fingers 297, 297' and at a predetermined distance D from tip ends 1006, 1006' of the fingers 297, 297', as shown. The support members 1001, 1001' may be formed of the same or different material as the fingers 297, 297'. The finger support members 1001, 1001' may be attached to and/or adhered to the fingers 297, 297' or may be integrally formed as integral members of the fingers 297, 297'. The finger support members 1001, 1001' include raised flat surfaces 1020, 1020' that are the distance D from tip ends 1006, 1006'. The raised flat surfaces 1020, 1020' prevent emblem slip-off from the grippers 210, 210' due to buckling when the foam carrier of the emblem assembly 1002 is too soft or shifting when the emblem assembly 1101 has thin beveled edges. The raised flat surfaces 1020, 1020' may extend perpendicular to the inner sides of the fingers 297, 297'.

Figure 12:
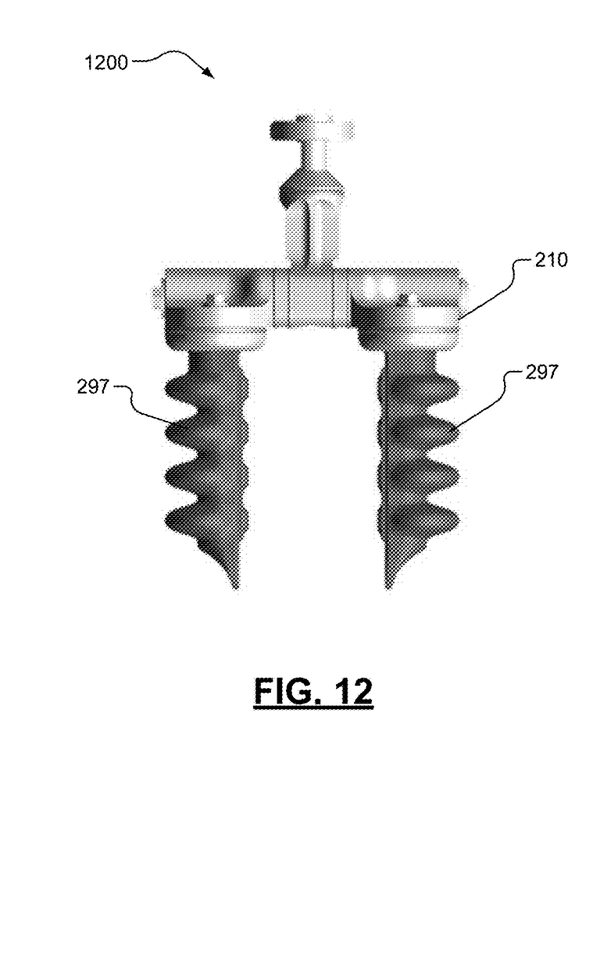
FIG. 12 is a side end view of a portion of the end-effector of FIG. 2 illustrating a free-neutral state of a gripper in accordance with the present disclosure.

FIG. 12 shows a portion 1200 of the end-effector 204 of FIGS. 2-6 illustrating a free-neutral state of one of the grippers 210. This may be when neither a positive pressure nor a negative pressure of air is provided in the fingers 297. FIG. 13 shows a portion 1300 of the end-effector 204 of FIGS. 2-6 illustrating a free-closed state of one of the grippers 210 when a positive amount of air pressure is supplied to the fingers 297. FIG. 14 shows a portion 1400 of the end-effector 204 of FIGS. 2-6 illustrating a free-open state of one of the grippers 210 when a negative amount of air pressure is provided for the fingers 297.

FIG. 15 shows a portion 1500 of the end-effector 204 of FIGS. 2-6 illustrating a tied-closed state of the gripper 212 and its fingers 299. FIG. 16 shows a portion 1600 of the end-effector 204 of FIGS. 2-6 illustrating a tied-open state of the gripper 212 and its the fingers 299. The peeling operation starts with the tie-closed state of the gripper 212 and its fingers 299 to push up the leading edge of the foam carrier and/or face liner of a partial emblem assembly 240 of FIGS. 2-6, then switch to the tie-open state and the tie-closed state immediately ensued of the gripper 212 and its fingers 299 such that the lightly pushed-up foam carrier and/or face liner of the partial emblem assembly 240 can be grasped and peeled by the gripper 212 and its fingers 299 as the robot 202 of FIG. 2 moves the end effector 204 away from the panel.

The tie-wrap 370 is used to control the shape of the fingers 299 to be parallelly closed for grasping thin materials, such as the foam carrier and face liner, with maximal contact surface area. Without the tie-wrap 370, the shape of the fingers 299 will grasp the foam carrier and/or face liner of the partial emblem assembly 240 in convex shape as shown in FIG. 13 with only the finger tips 1006 or 1102, which is not adequate to keep the foam carrier and/or face liner of the partial emblem assembly 240 from slipping out of the gripper 212. In addition, the convex shape of the gripper fingers 299 makes it difficult to start pushing up the thin foam carrier and/or face liner of the partial emblem assembly 240 still laid flat on the panel surface. In one embodiment, the tie-wrap 370 is wrapped around center areas of the gripper 212, for example, between second and third ribs 1502, 1504 of the gripper 212 as shown.

FIG. 17 shows an example of another end-effector 1700 having one or more emblem assembly grabbing grippers with fingers 1702 in a circular configuration and in a closed state and a roller 1704 in an idle state. FIG. 18 shows the end-effector 1700 with the fingers 1702 in an open state and a roller 1704 in an active mode. The end-effector 1700 may replace, be configured similarly as, and operate similarly as the end-effector 204 of FIG. 2. The end-effector 1700 also includes a peeling gripper 1706 having fingers 1707 and a tie-wrap 1708. The fingers 1702, 1707 have corresponding ribs and tips, similar to the fingers 297, 299 of FIGS. 2-6. The end-effector 1700 also may include an adaptor 1720, a support frame 1722, and splitters 1724, 1726, which are similar to and may function similar to the adaptor 300, support frame 302, and splitters 260, 320 of FIGS. 2-6.

The fingers 1702 and corresponding finger holders 1730 of the splitter 1724 are arranged in a circular pattern. The finger holders 1730 extend radially from a center portion 1732 of the splitter 1724. Five finger holders and five fingers are shown, but a different number of each may be included. The five fingers may operate as one or more grippers, where each gripper includes two or more fingers. An air line coupling 1734 and a circular emblem assembly 1736 are shown. The air line coupling 1734 may receive air for the fingers 1702. A separate air line coupling may be included for the fingers 1707.

Figure 19:
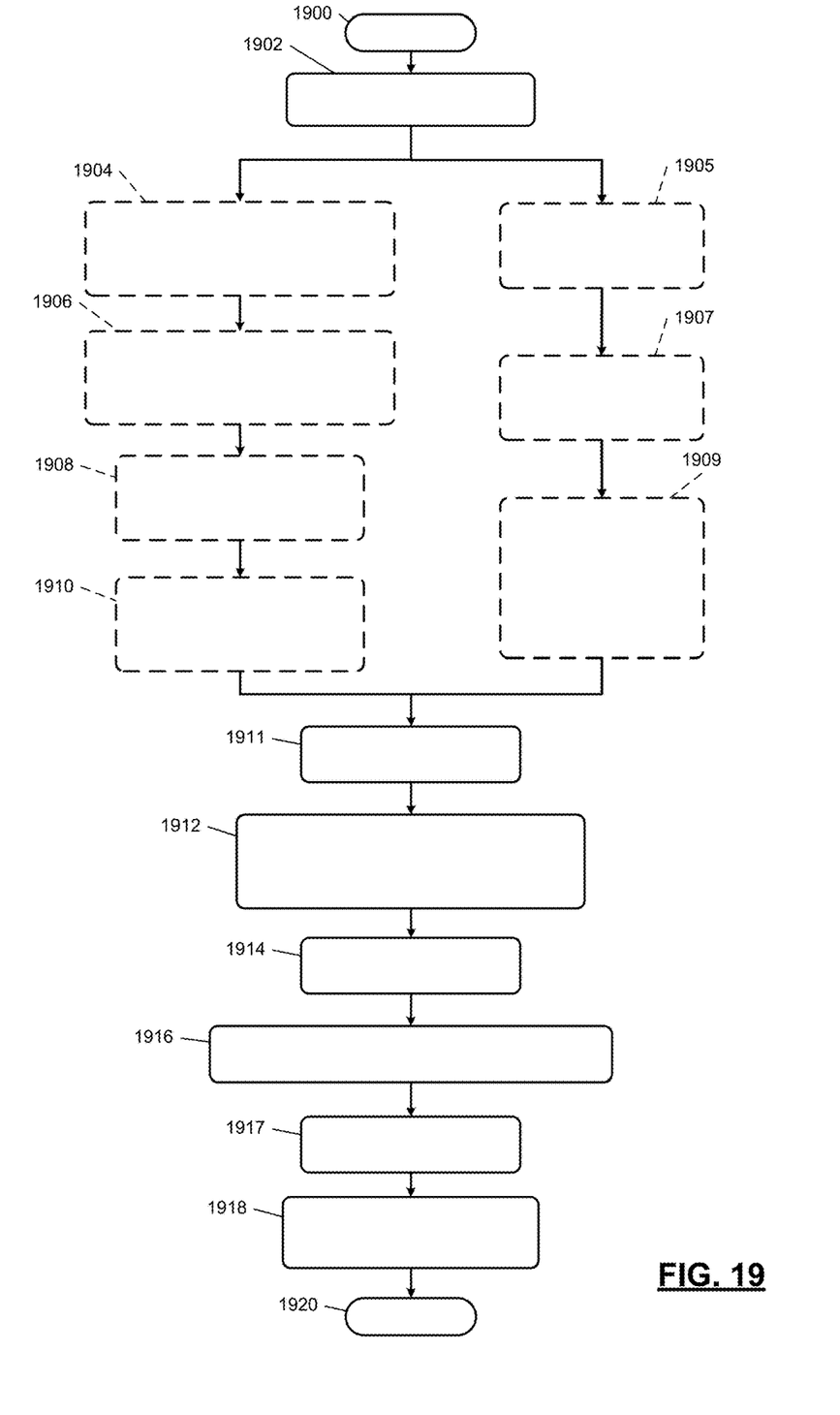
FIG. 19 shows an emblem installation process in accordance with the present disclosure.

FIG. 19 shows an emblem installation process for attaching an emblem to an object (e.g., a body panel of a vehicle). The following operations may be performed by a control module through control of a robot, an end-effector, and grippers such as via the control module 206, robot 202, end-effectors 204, 1700 and corresponding grippers of FIGS. 2-18. Although the following operations are primarily described to with respect to the end-effector 204 of FIGS. 2-6, the operations are also applicable to the end-effector 1700 of FIGS. 17-18.

The method may begin at 1900. At 1902, the end-effector 204 is moved to pick up an emblem assembly. The control module 206 moves the end-effector 204 to pick up (or grab) an emblem assembly out of a bin or magazine. The emblem grabbing grippers 210 may be in an open state and closed to grab the emblem assembly. An example of this is shown in FIG. 3.

At 1904, the emblem assembly may be moved to a location where the emblem assembly is transferred from the grippers 210 to a gripper and/or a stand separate from the end-effector 204. As an example, the gripper may be mounted on the table 244 of FIG. 2. This is done to allow the gripper 212 to grab and remove an adhesive liner (e.g., tape liner) while the emblem assembly is held by the gripper and/or stand. The corresponding operations are represented by operations 1904, 1906, 1908, 1910. In another embodiment, the emblem assembly is moved to a location where another gripper, separate from the end-effector 204, is able to grab the adhesive liner. The robot 202 moves the end-effector 204 to remove the adhesive liner. This is represented by operations 1905, 1907 and 1909. The gripper(s) on the stand may be configured and operate similarly as any of the grippers referred to herein.

At 1904 and in one embodiment, the end-effector 204 is moved to place the emblem assembly in a stand and/or to be held by a gripper of the stand, as described above. At 1906, the end-effector 204 may be moved and actuated to place the peeling gripper 212 in an active state and the emblem grabbing grippers 210 in an idle and/or open state.

At 1908, the control module 206 may move the end-effector 204 and close the peeling gripper 212 to grab an end of an adhesive liner (e.g., a tape liner) of the emblem assembly. The robot 202 then moves the end-effector 204 to peel the adhesive liner from the emblem (e.g., name plate) being installed. The robot 202 moves the end-effector 204 in a lateral or vertical direction to peel off the adhesive liner.

At 1910, the end effector 204 may be moved back to the partial emblem assembly and the grippers 210 are actuated to pick up the partial emblem assembly from the gripper stand while the peeling gripper 212 is placed to an idle state.

At 1905 and in another embodiment, the end-effector 204 may be moved to be near a stand. The stand may include a gripper. At 1907, the control module 206 may control the gripper on the stand to grab the adhesive liner while the grippers 210 hold a portion of the emblem assembly. At 1909, the control module 206 may move the end-effector 204 to peel the adhesive liner from the emblem (e.g., name plate) being installed. The robot 202 moves the end-effector 204 in a lateral or vertical direction to peel off the adhesive liner.

At 1911, the control module 206 moves the end-effector 204 to place and adhere the emblem on the object. Operations 1906-1911 may be referred to as pick-and-place operations.

At 1912, the control module 206 releases the portion of the emblem assembly by placing the emblem grabbing grippers 210 in an open state and moves the roller 214 to be in an active state.

At 1914, the control module 206 moves the roller 214 across the front surface of the emblem assembly while applying pressure on the emblem assembly to wet out an adhesive layer. The control module 206 may move the roller 214 laterally or vertically across the surface of the face liner while applying pressure. A set amount of pressure may be applied via the roller 214 for a set period of time. The robot 202 may drag and press the roller on the portion of the emblem assembly to wet out the emblem adhesive layer on the object.

At 1916, the control module 206 rotates the end-effector 204 to place the roller 214 in an idle state and the peeling gripper 212 in an active state. At 1917, the control module 206 controls actuation of the peeling gripper 212 to grab the face liner by a quick open and close of the gripper fingers 299. At 1918, the control module 206 moves the end-effector to peel off the face liner, which may include peeling off a foam carrier or the foam carrier may be peeled off in a subsequent operation. The method may end at 1920.

The above-described examples include end-effectors for robotically automating emblem installation on vehicles and other various objects. Each of the end-effectors includes multiple grippers and a roller, which are used to execute all operations of emblem installation. Each of the end-effectors is a 3-in-1 end-effector that is able to complete five or more operations of an emblem installation process using a single tool (i.e. the end-effector). The 3-in-1 end-effectors may include (i) pick-and-place soft grippers (also referred to above as emblem grabbing grippers) for picking, pacing and holding an emblem assembly and/or portion thereof, (ii) a rubber roller for rolling and pressing over the emblem assembly to wet out an adhesive bonding layer, and (iii) a peeling soft gripper for peeling off layers of the emblem assembly including a foam carrier layer and a face liner.

The disclosed peeling gripper includes a tie-wrap that effectively provides shortened high-strength gripper for peeling off a foam carrier and a face liner of an emblem assembly. Shafts of the disclosed rollers are positioned adjacent to the emblem grabbing grippers and each have a longitudinal center axis (or axis of rotation) that is perpendicular to a rolling direction. This allows the rollers to be moved and easily wet out using pressing force on an emblem assembly subsequent to placement of the emblem assembly on an object. The fingers of the emblem grabbing grippers are curled to clear the way for the wetting out of the emblem assembly.

The multi-tasking end-effectors with flexible fingers reduces costs associated with having multiple separate tools for different emblem installation operations and for different emblem assembly types, sizes, and styles. The need to change over to different tools and the use of manually performed operations are eliminated. The end-effectors enable robotic automation of emblem installation and reduces product defect rates and warranty costs.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An end-effector for installation of an emblem assembly, the end-effector comprising:
   a support frame;
   a first splitter;
   a second splitter,
   wherein the first splitter and the second splitter are connected to the support frame;
   a plurality of pneumatically actuated grippers comprising
      a first gripper connected to the first splitter and configured to grab at least a portion of the emblem assembly, and
      a second gripper connected to the second splitter and configured to peel off one or more layers of the emblem assembly; and
   a roller connected to the support frame and configured to wet out an adhesive layer of the emblem assembly.

2. The end-effector of claim 1, wherein the first splitter comprises:
   a center member, and
   a plurality of finger holding members attached to the center member.

3. The end-effector of claim 1, wherein:
   the plurality of pneumatically actuated grippers further comprise a third gripper connected to the first splitter; and
   the first gripper and the third gripper are configured for at least one of concurrent actuation or independent actuation.

4. The end-effector of claim 1, wherein:
   the first splitter is connected to the support frame via an adaptor; and
   the adaptor is configured to connect the support frame and the first splitter to a robot.

5. The end-effector of claim 1, wherein the first gripper comprises finger support members arranged on fingers of the first gripper to prevent at least one of buckling of a layer of the emblem assembly or movement of the emblem assembly, relative to the first gripper due to contact force applied on the emblem assembly as a result of contacting an object during placement of the emblem assembly on the object.

6. The end-effector of claim 5, wherein the finger support members are attached to respective inner sides of the fingers.

7. The end-effector of claim 1, wherein the second gripper includes a tie-wrap wrapped around fingers of the second gripper and limiting movement of the fingers of the second gripper.

8. The end-effector of claim 1, wherein the roller is connected adjacent to the first gripper and having an axis of rotation perpendicular to a rolling direction to be rolled over the emblem assembly.

9. The end-effector of claim 1, further comprising one or more additional grippers connected to the first splitter and configured to grab at least a portion of the emblem assembly.

10. The end-effector of claim 1, wherein fingers of the first gripper are arranged in a circular pattern.

11. An emblem installation system comprising:
the end-effector of claim 1;
a pump configured to supply air to or draw air from the end-effector to actuate the first gripper and the second gripper; and
a controller configured to control operation of the pump based on mode of operation.

12. The emblem installation system of claim 11, further comprising a robot connected to the end-effector,
wherein the controller is configured to control operation of the robot to move the end-effector for placement of the emblem assembly on an object, to wet out the adhesive layer by moving the end-effector via the robot, and to peel off the one or more layers of the emblem assembly.

13. A method of installing an emblem assembly, the method comprising:
moving an end-effector to at least one of picking up or grabbing the emblem assembly via a first gripper of the end-effector, wherein the emblem assembly includes a first liner, an adhesive layer, an emblem, and a second liner;
peeling off the first liner from the emblem assembly;
moving the end-effector and placing the emblem assembly on an object;
releasing the first gripper from the emblem assembly;
moving the end-effector to position a roller of the end-effector against the emblem assembly;
wetting out the adhesive layer including rolling the roller over the emblem assembly while applying pressure on the emblem assembly;
moving a second gripper to grab a portion of the second liner; and
moving the end-effector to peel off the second liner.

14. The method of claim 13, further comprising grabbing a portion of the first liner with the second gripper,
wherein the first liner is peeled off the emblem assembly while maintaining grip on the first liner.

15. The method of claim 13, further comprising holding portions of fingers of the second gripper together via a tie-wrap.

16. The method of claim 13, wherein the at least one picking up or grabbing the emblem assembly includes pneumatically actuating fingers of the first gripper including providing a positive pressure in the fingers of the first gripper to close the first gripper.

17. The method of claim 13, wherein releasing the first gripper and wetting out the adhesive layer includes pneumatically actuating fingers of the first gripper including providing a negative pressure in the fingers of the first gripper to open and curl up the fingers.

18. The method of claim 13, wherein peeling away the second liner includes pneumatically actuating fingers of the second gripper including providing a negative, then positive pressure in the second gripper to open and close the second gripper.

19. The method of claim 13, further comprising providing gripper support elements on fingers of the first gripper to prevent at least one of;
buckling of a layer of the emblem assembly, or
slipping-off of the emblem assembly from the first gripper due to contact force applied on the emblem assembly by placing the emblem assembly on the object.

20. The method of claim 13, further comprising peeling away a foam carrier from the emblem assembly using the second gripper.

* * * * *